United States Patent
Hudgens et al.

(10) Patent No.: US 9,512,763 B2
(45) Date of Patent: Dec. 6, 2016

(54) DIESEL EXHAUST FLUID DOSING SYSTEM FOR DIESEL ENGINE AFTERTREATMENT MODULE

(71) Applicant: Caterpillar Inc., Peoria, IL (US)

(72) Inventors: Jason Hudgens, Washington, IL (US); Matthew Fahrenkrug, Chillicothe, IL (US); Theron Cassidy, Peoria, IL (US); Brian Cole, Peoria, IL (US); Kevin Dea, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 76 days.

(21) Appl. No.: 14/562,250

(22) Filed: Dec. 5, 2014

(65) Prior Publication Data
US 2016/0160725 A1 Jun. 9, 2016

(51) Int. Cl.
*F01N 3/00* (2006.01)
*F01N 3/20* (2006.01)
*F01N 3/28* (2006.01)

(52) U.S. Cl.
CPC .......... *F01N 3/2066* (2013.01); *F01N 3/2892* (2013.01); *F01N 3/2896* (2013.01); *F01N 2570/14* (2013.01)

(58) Field of Classification Search
USPC ................. 60/286, 287, 289, 295, 297, 300, 301,60/303
See application file for complete search history.

(56) References Cited

U.S. PATENT DOCUMENTS

| | | | |
|---|---|---|---|
| 6,182,444 B1* | 2/2001 | Fulton | B01D 53/9495 60/274 |
| 7,775,034 B2* | 8/2010 | Suzuki | F01N 3/0253 60/274 |
| 8,042,328 B2* | 10/2011 | Ono | B01D 53/9431 60/286 |
| 8,109,077 B2* | 2/2012 | Reba | F01N 3/0253 60/274 |
| 8,234,854 B2 | 8/2012 | Kesse et al. | |
| 8,381,514 B2* | 2/2013 | Salanta | F01N 3/206 60/286 |
| 8,387,371 B2 | 3/2013 | Zhang et al. | |
| 8,468,810 B2 | 6/2013 | Thomas et al. | |
| 8,511,067 B2 | 8/2013 | Basista et al. | |

(Continued)

FOREIGN PATENT DOCUMENTS

EP 1770251 B1 12/2012

*Primary Examiner* — Binh Q Tran
(74) *Attorney, Agent, or Firm* — Miller, Matthias & Hull LLP (57) ABSTRACT

A dosing system for dosing diesel exhaust fluid (DEF) into an inlet of a selective catalytic reduction (SCR) aftertreatment module of a diesel engine is described. The dosing system may comprise a DEF supply line configured to deliver the DEF from a pump to a first injector and a second injector at the inlet. The DEF supply line may include a tri-axis connector configured to split the DEF from the pump into two portions each exiting one of a first outlet port and a second outlet port, a first delivery conduit configured to deliver the DEF exiting the first outlet port to the first injector, and a second delivery conduit configured to deliver the DEF exiting the second outlet port to the second injector. The first injector and the second injector may dose the same quantity of the DEF into the inlet of the aftertreatment module.

19 Claims, 6 Drawing Sheets

(56) References Cited

U.S. PATENT DOCUMENTS

| | | | | |
|---|---|---|---|---|
| 8,647,162 B2* | 2/2014 | Henriksson | ............... | B63J 2/06 |
| | | | | 114/211 |
| 8,881,507 B2* | 11/2014 | Yan | ...................... | F01N 3/2066 |
| | | | | 60/274 |
| 2007/0251226 A1 | 11/2007 | Kaneko | | |
| 2011/0023466 A1 | 2/2011 | Branco et al. | | |
| 2013/0298533 A1 | 11/2013 | Kowalkowski et al. | | |

\* cited by examiner

DIESEL EXHAUST FLUID DOSING SYSTEM FOR DIESEL ENGINE AFTERTREATMENT MODULE

TECHNICAL FIELD

The present disclosure generally relates to diesel engines and, more specifically, relates to exhaust gas treatment systems for diesel engines.

BACKGROUND

A diesel engine is a type of internal combustion engine that uses the heat generated through compression of fuel and oxygen to initiate the ignition of that fuel that has been injected into the combustion chamber of the engine. In the combustion chamber, the fuel is combusted in the presence of oxygen to produce high-temperature and high-pressure combustion products which apply a force to one or more components of the engine, thereby providing mechanical energy. The exhaust gas emitted from a diesel engine may contain various gaseous emissions such as nitrogen oxides ($NO_x$) which may contain nitrogen dioxide ($NO_2$). When released into the atmosphere, $NO_2$ may develop as a yellow-brown haze over cities, and is one of the components of smog.

In an effort to decrease the amount of $NO_x$ released into the atmosphere, increasingly stringent emission standards require limiting the amount of $NO_x$ emissions. Specifically, in the United States, regulations may limit $NO_x$ emssions to 0.4 g/kW·h for off-road diesel engines having brake horsepowers between 175-750. One type of diesel engine exhaust treatment technology that has been used to reduce $NO_x$ emissions from diesel engines is a selective catalytic reduction (SCR) aftertreatment system. In operation, a reductant, such as an aqueous urea solution, also referred to as diesel exhaust fuel (DEF), is injected into the exhaust gases upstream of an SCR catalyst. The urea may decompose to ammonia and, in the presence of the SCR catalyst, the ammonia may serve as a reducing agent to reduce the $NO_x$ in the exhaust steam to nitrogen and water which are then expelled through the tailpipe. In this way, SCR aftertreatment systems may reduce $NO_x$ emissions by 90 percent or more.

In higher horsepower diesel engines with higher exhaust gas volumes, multiple DEF injectors and/or multiple SCR aftertreatment modules may be placed in the exhaust stream to effectively meet emission standards. For example, U.S. Patent Application Publication number 2011/0023466 describes the use of multiple nozzle-injectors for delivering DEF to an exhaust gas of a diesel engine upstream of an SCR catalyst.

While effective, current DEF dosing systems may suffer from a number of drawbacks. For example, the pump used to deliver the DEF to the injector(s) may have a pumping capability which exceeds the dosing capability of the injector(s), such that the entire pumping capability of the pump is not fully used. In addition, accurate control and prediction of the amount of DEF injected into the exhaust stream may be complicated by the tendency of DEF to form deposits in the exhaust line which may not reach the SCR catalyst for $NO_x$ reduction. Furthermore, it may be difficult to meet the energy requirements for heating systems used to thaw DEF supply lines exposed to low temperatures within government-specified timeframes, particularly when using multiple DEF supply lines and/or longer DEF supply lines.

Clearly, there is a need for improved DEF dosing system designs for SCR aftertreatment modules in diesel engines.

SUMMARY

In accordance with one aspect of the present disclosure, a dosing system for dosing diesel exhaust fluid (DEF) into an inlet of a selective catalytic reduction (SCR) aftertreatment module of a diesel engine is disclosed. The dosing system may comprise a pump configured to pump the DEF from a supply source, and a first injector and a second injector configured to inject the DEF into the inlet of the SCR aftertreatment module. The dosing system may further comprise a DEF supply line configured to deliver the DEF from the pump to the first injector and the second injector. The DEF supply line may include a tri-axis connector having a first outlet port and a second outlet port. The tri-axis connector may be in fluid communication with the pump and may be configured to split the DEF from the pump into two portions each exiting one of the first outlet port and the second outlet port. The DEF supply line may further include a first delivery conduit in fluid communication with the first outlet port that may be configured to deliver the DEF exiting the first outlet port to the first injector, and a second delivery conduit in fluid communication with the second outlet port that may be configured to deliver the DEF exiting the second outlet port to the second injector. The first delivery conduit and the second delivery conduit may be configured such that the first injector and the second injector dose a same quantity of the DEF into the inlet.

In accordance with another aspect of the present disclosure, a diesel engine is disclosed. The diesel engine may comprise a combustor, an exhaust line, and a selective catalytic reduction (SCR) aftertreatment module in fluid communication with the exhaust line. The SCR aftertreatment module may include an inlet and a dosing system configured to dose diesel exhaust fluid (DEF) into the inlet. The dosing system may include a pump configured to pump the DEF from a supply source, and a first injector and a second injector mounted on a top of the inlet and configured to inject the DEF into the inlet of the SCR aftertreatment module. The dosing system may further include a DEF supply line mounted on a side of the SCR aftertreatment module and configured to deliver the DEF from the pump to the first injector and the second injector. The DEF supply line may include a tri-axis connector having a first outlet port and a second outlet port. The tri-axis connector may be in fluid communication with the pump and may be configured to split the DEF from the pump into two portions each exiting one of the first outlet port and the second outlet port. The DEF supply line may further include a first delivery conduit in fluid communication with the first outlet port that may be configured to deliver the DEF exiting the first outlet port to the first injector, and a second delivery conduit in fluid communication with the second outlet port that may be configured to deliver the DEF exiting the second outlet port to the second injector. The first delivery conduit and the second delivery conduit may be configured such that the first injector and the second injector dose a same quantity of the DEF into the inlet.

In accordance with another aspect of the present disclosure, a method for dosing diesel exhaust fluid (DEF) into an inlet of a selective catalytic reduction (SCR) aftertreatment module of a diesel engine is disclosed. The method may comprise splitting a flow of the DEF from a pump into two portions with a tri-axis connector such that the two portions each exit one of a first outlet port and a second outlet port of the tri-axis connector. The method may further comprise flowing the DEF exiting the first outlet port through a first delivery conduit, and flowing the DEF exiting the second outlet port through a second delivery conduit. The method may further comprise heating the DEF flowing through the tri-axis connector, the first delivery conduit, and the second delivery conduit with a heating system, and the tri-axis connector may be configured to provide a clearance for the heating system. In addition, the method may further comprise delivering the DEF from the first delivery conduit to a first injector, and delivering the DEF from the second delivery conduit to a second injector. The method may further comprise dosing the DEF into the inlet of the SCR aftertreatment module with the first injector and the second injector, and the first injector and the second injector may dose a same quantity of the DEF into the inlet.

These and other aspects and features of the present disclosure will be more readily understood when read in conjunction with the accompanying drawings.

It should be understood that the drawings are not necessarily drawn to scale and that the disclosed embodiments are sometimes illustrated schematically and in partial views. It is to be further appreciated that the following detailed description is merely exemplary in nature and is not intended to limit the invention or the application and uses thereof. In this regard, it is to be additionally appreciated that the described embodiment is not limited to use with a particular type of diesel engine. Hence, although the present disclosure is, for convenience of explanation, depicted and described as certain illustrative embodiments, it will be appreciated that it can be implemented in various other types of embodiments and in various other systems and environments.

DETAILED DESCRIPTION

Figure 1:
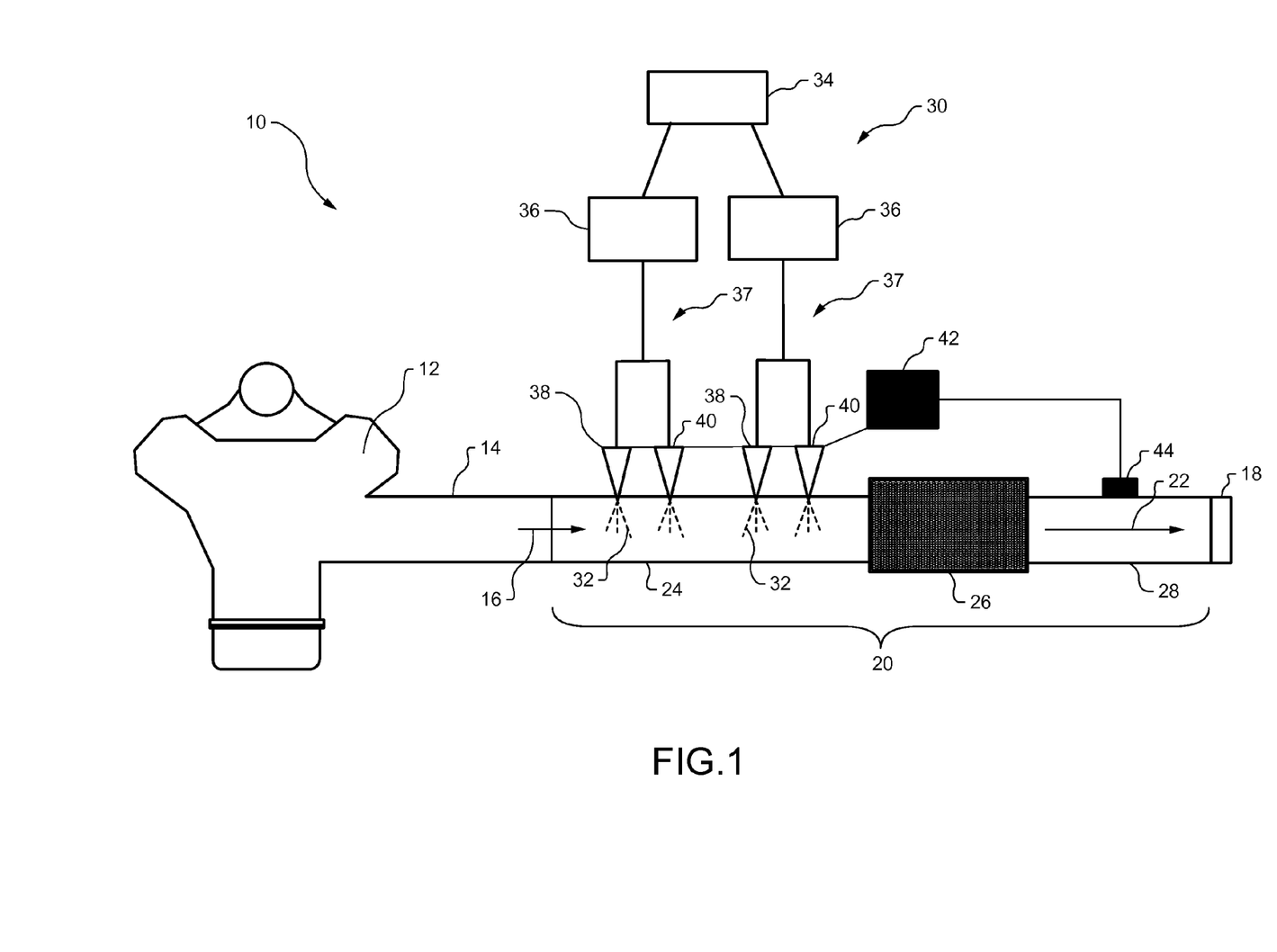
FIG. 1 is a schematic representation of a selective catalytic reduction (SCR) aftertreatment module in an exhaust line of a diesel engine, in accordance with the present disclosure.

Referring now to the drawings, and with specific reference to FIG. 1, a schematic representation of a diesel engine 10 is shown. The diesel engine 10 may be a large engine, such as an engine having a horsepower of 750 or more, although it may have a smaller horsepower in some cases. As non-limiting examples, the diesel engine 10 may be used in a mining truck, a hydraulic mining shovel, a tractor, a wheel loader, electric power generators or other similar machines. It may include at least one combustion chamber 12 where fuel may be combusted with oxygen, as well as an exhaust line 14 for carrying an exhaust gas 16 to a tailpipe 18. The diesel engine 10 may further include one or more selective catalytic reduction (SCR) aftertreament modules 20 disposed in and in fluid communication with the exhaust line 14, as shown. The aftertreatment module(s) 20 may convert the exhaust gas 16 to a treated gas 22 with a reduced $NO_x$ content that may then be released from the engine 10 to an external atmosphere through the tailpipe 18. Specifically, in the presence of an ammonia-based reductant, the aftertreatment module 20 may convert $NO_x$ in the exhaust line 14 to nitrogen and water. It will be understood that larger engines with higher volumes of exhaust gas 16 may have a greater number of aftertreatment modules 20 in the exhaust line 14 to suitably convert the exhaust gas 16.

The aftertreatment module 20 may include an inlet 24 in fluid communication with the exhaust line 14, a selective catalytic reduction (SCR) catalyst 26 downstream of the inlet 24, and an outlet 28 downstream of the SCR catalyst 26. The SCR catalyst 26 may include a flow-through ceramic having a catalytic composition applied thereto. The catalytic composition may contain zeolite and one or more metal components such as, but not limited to, vanadium, iron, cobalt, platinum, palladium, or copper. However, the composition of SCR catalysts 26 is well known to one of ordinary skill in the art and the present invention is not limited to the above described embodiments.

The aftertreatment module 20 may also include a dosing system 30 configured to dose a reductant, e.g., diesel exhaust fluid (DEF) 32, preferably as a fine mist or spray, into the inlet 24 for mixing with the exhaust gas 16. The DEF 32 may be a solution of urea in water, such as a solution of about 32.5% urea in about 67.5% water, although other urea contents may also be used. When dosed into the inlet 24, the DEF 32 may produce ammonia which may serve as a reducing agent to reduce $NO_x$ in the exhaust gas 16 to nitrogen and water in the presence of the SCR catalyst 26.

The dosing system 30 may include a supply tank 34 containing a supply of the DEF 32, and one or more pumps 36 each configured to pump the DEF 32 out of the supply tank 34. In addition, the dosing system 30 may further include one or more DEF supply lines 37 each configured to deliver the DEF 32 from one of the pumps 36 to two injectors (a first injector 38 and a second injector 40). In addition, the total dosing capability of the two injectors 38 and 40 may be less than, equal to, or greater than the pumping capability of the pump 36. If the total dosing capability of the injectors is at least equal to the total pumping capability of the injectors 38 and 40, then the entire pumping capability of the pump 36 may be used. As a non-limiting example, the aftertreatment module 20 may include two pumps 36 each delivering DEF to two injectors 38 and 40, as shown. It will be understood, however, that the total number of pumps 36 and injectors 38 and 40 used in the aftertreatment module 20 may vary depending on the quantities of $NO_x$ released by the diesel engine 10.

The injectors 38 and 40 may be solenoid valves controlled by a dosing control unit (DCU) 42 which may be in electrical communication with the injectors 38 and 40. Specifically, the DCU 42 may control the amount of the DEF dosed into the inlet 24 by the injectors 38 and 40 by regulating how long the valves of the injectors stay open. In addition, the DCU 42 may be in electrical communication with a $NO_x$ sensor 44 positioned at the outlet 28 or at the tailpipe 18, although in additional embodiments the $NO_x$ sensor 44 may be positioned at a more upstream location such as near the exhaust line 14 and/or the inlet 24. Thus, the DCU 42 may increase or decrease the amount/volume of the DEF 32 injected into the inlet 24 based on the $NO_x$ levels in the treated gas 22 detected by the $NO_x$ sensor 44.

Figure 2:
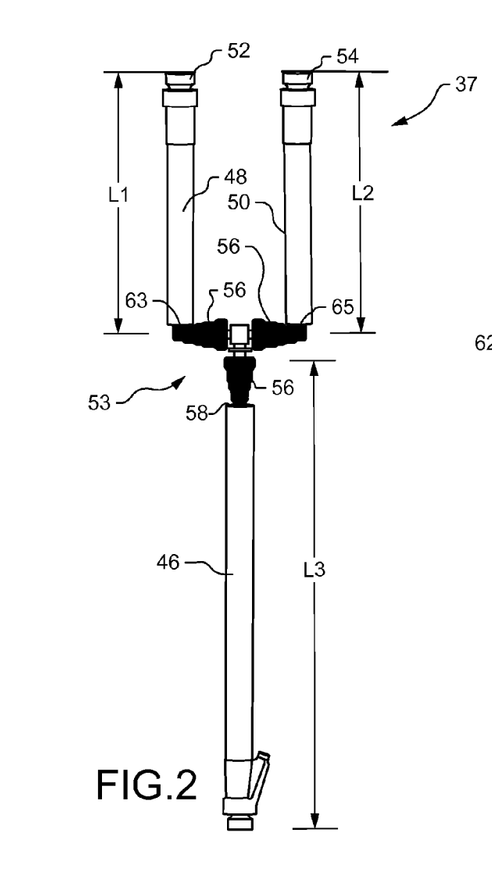
FIG. 2 is front view of a DEF supply line of the aftertreatment module shown in isolation, constructed in accordance with the present disclosure.
Figure 3:
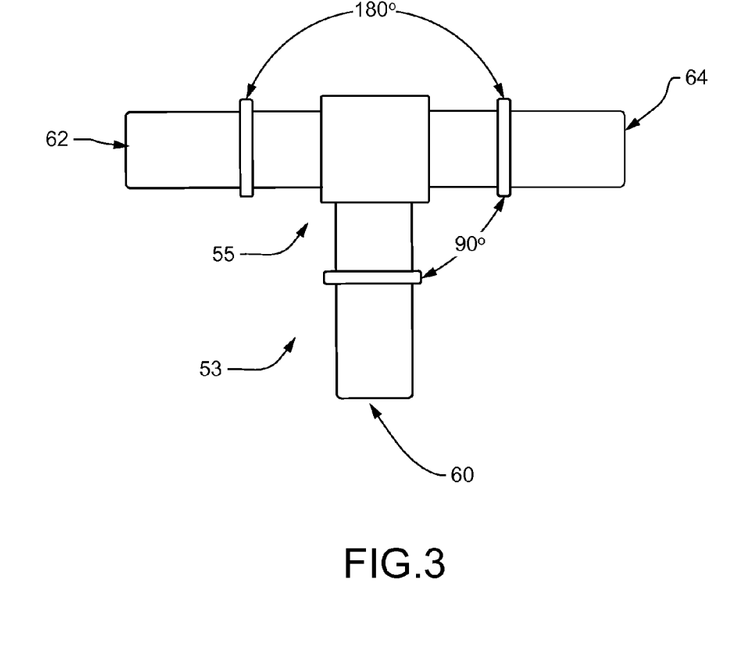
FIG. 3 is a front view of a tri-axis connector used in the DEF supply line of FIG. 2, constructed in accordance with the present disclosure.

Turning now to FIGS. 2-3, a more detailed depiction of the DEF supply line 37 of the dosing system 30 is shown. The DEF supply line 37 may include a supply conduit 46 which may be in fluid communication with the pump 36 and may receive the DEF 32 from the pump 36. In addition, the DEF supply line 37 may also have a first delivery conduit 48 and a second delivery conduit 50 that may deliver the DEF 32 from the supply conduit 46 to the first injector 38 and the second injector 40, respectively. The first delivery conduit 48 may have an outlet 52 in fluid communication with the first injector 38, while the second delivery conduit 50 may have an outlet 54 in fluid communication with the second injector 40. The supply conduit 46, the first delivery conduit 48, and the second delivery conduit 50 may each be multi-layered hoses with an inner layer formed from ethylene propylene diene monomer (EPDM) rubber and an outer layer formed from plastic, although many other types of materials may also be used.

The DEF supply line 37 may further include a tri-axis connector 53 at the junction of the supply conduit 46, the first delivery conduit 48, and the second delivery conduit 50, as best shown in FIG. 3. Specifically, the tri-axis connector 53 may have an inlet port 60 connected to and in fluid communication with an outlet 58 of the supply conduit 46, a first outlet port 62 connected to and in fluid communication with an inlet 63 of the first delivery conduit 48, and a second outlet port 64 connected to and in fluid communication with an inlet 65 of the second delivery conduit 50. In addition, adapters 56 may be used at the connection points between the tri-axis connector 53 and the conduits 46, 48, and 50, as shown.

The tri-axis connector 53 may split the DEF 32 exiting the supply conduit 46 into two equivalent fluid portions that may then exit the first outlet port 62 and the second outlet port 64, respectively. The first delivery conduit 48 may then deliver the DEF 32 exiting the first outlet port 62 to the first injector 38, while the second delivery conduit 50 may deliver the DEF 32 exiting the second outlet port 64 to the second injector 40. In one aspect of the present disclosure, the tri-axis connector 53 may be a T-connector 55 in which the first outlet port 62 and the second outlet port 64 may be separated by about 180° (±5°) from each other, while the first outlet port 62 and the second outlet port 64 may be separated by about 90° (±5°) from the inlet port 60, as best shown in FIG. 3. In particular, applicants have found that such separation of the T-connector ports provides favorable clearance for the adapters 56 as well as a heating system that is used to heat the DEF supply line 37, as will be described in further detail below (see FIG. 7). However, it will be understood that the tri-axis connector 53 may also be a Y-connector in which the outlet ports 62 and 64 are closer together than about 180°, provided that the Y-connector provides suitable clearance for the adapters 56 and the heating system described below.

Notably, the first delivery conduit 48 and the second delivery conduit 50 may be configured to deliver the two fluid portions of the DEF 32 to the first injector 38 and the second injector 40 at the same (i.e., within ±10%) flow rates and fluid pressures, such that the amount of the DEF 32 dosed into the inlet 24 by each of the two injectors 38 and 40 are the same (i.e., within ±10% of each other). This feature may enable precise control and prediction over the amount of the DEF 32 injected into the mixing portion of the inlet 24 that is available for $NO_x$ reduction. However, it is also noted that in some circumstances, the injectors 38 and 40 may be independently regulated such that the flow rates of the DEF 32 out of the injectors 38 and 40 may differ from each other.

As one possibility, the first delivery conduit 48 and the second delivery conduit 50 may have passageways with equivalent inner diameters and equivalent lengths. Specifically, a length (L1) of the first delivery conduit 48 may be equivalent (within ±1%) to a length (L2) of the second delivery conduit 50, as best shown in FIG. 2. Such an arrangement may ensure that the hydraulic pressure losses experienced by the DEF 32 flowing through the first delivery conduit 48 and the second delivery conduit 50 are the same (i.e., within ±10%). Alternatively, the first delivery conduit 48 and the second delivery conduit 50 may be otherwise engineered (i.e., with specific lengths, inner diameters, bends, curves, etc.) to provide the same hydraulic pressure losses along the first and second delivery conduits 48 and 50.

Figure 4:
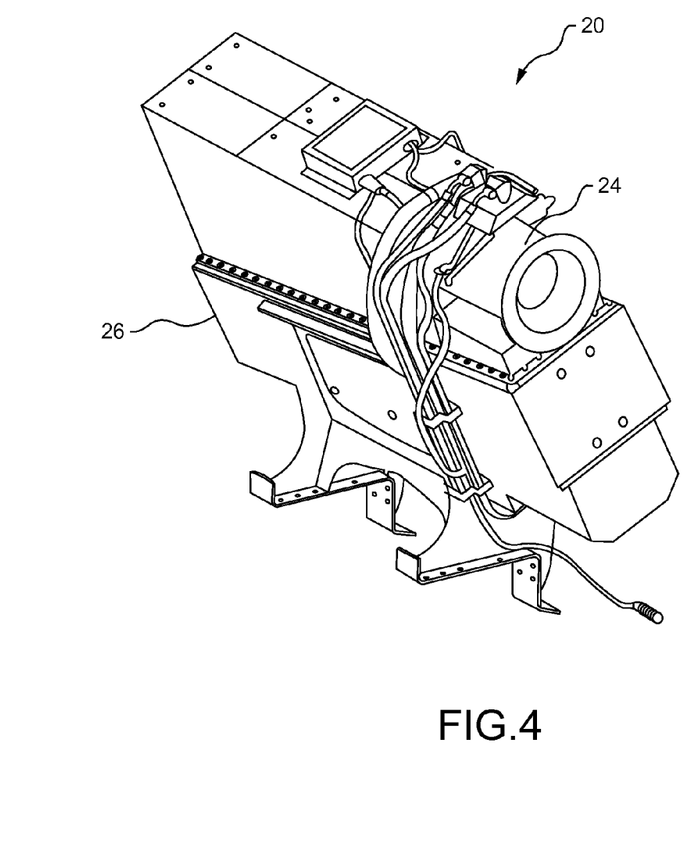
FIG. 4 is a perspective view of the aftertreatment module, constructed in accordance with the present disclosure.
Figure 5:
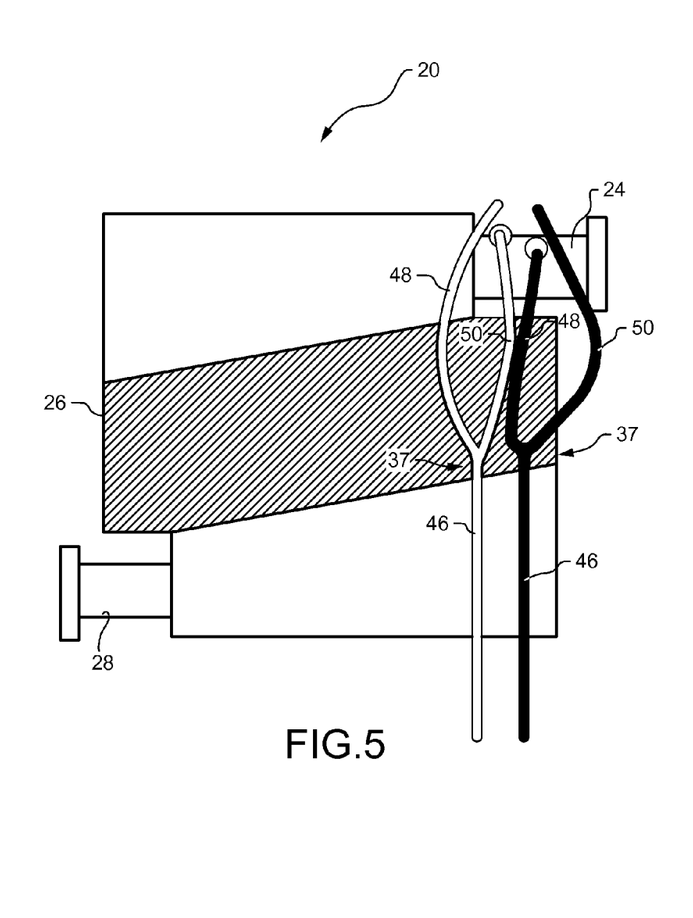
FIG. 5 is a side view of the aftertreatment module and the DEF supply lines shown in isolation, constructed in accordance with the present disclosure.
Figure 6:
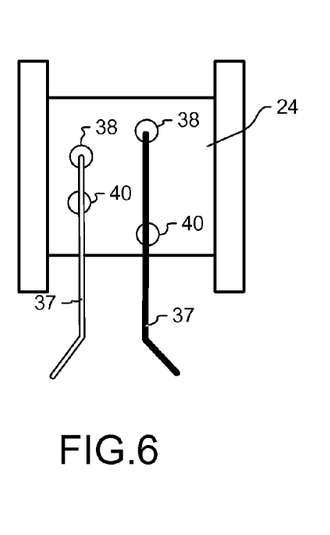
FIG. 6 is a top view of an inlet of the aftertreatment module and the DEF supply lines of FIG. 5, constructed in accordance with the present disclosure.

In one aspect of the present disclosure, the aftertreatment module 20 may have an "S"-like configuration in which the inlet 24 is positioned on top of the SCR catalyst 26 and the outlet 28 is positioned below the SCR catalyst 26, as best shown in FIGS. 4-5. In addition, the DEF supply line(s) 37 may be external to the aftertreatment module 20 and may be mounted or otherwise positioned on a side of the aftertreatment module 20, such that the conduits 46, 48, and 50 of each of the DEF supply lines 37 may run upwardly along the side of the aftertreatment module 20 to deliver the DEF 32 into the injectors 38 and 40 positioned on top of the inlet 24, as best shown in FIGS. 5-6. It is noted that the DEF supply lines 37 in FIG. 4 are obscured by other lines such as electrical lines.

Figure 7:
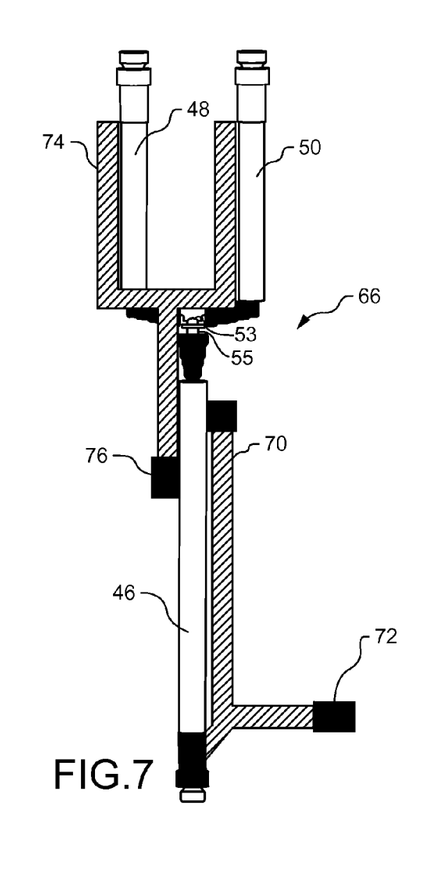
FIG. 7 is a front view of the DEF supply line similar to FIG. 2, but showing a heating system that may be used to heat the DEF supply line, constructed in accordance with the present disclosure.

Turning now to FIG. 7, a heating system 66 for heating the DEF 32 in the DEF supply line 37 is shown. As the DEF 32 may freeze at low temperatures (about 12° F./−11° C.), the heating system 66 may be used to thaw the DEF 32 in the DEF supply line 37 when it is exposed to low temperatures. In particular, applicants have found that heating of the tri-axis connector 53 with the heating system 66, in addition to the conduits 46, 48, and 50, helps to ensure that frozen DEF in the DEF supply line 37 is sufficiently thawed within government-specified timeframes. Applicants have found that when electrically heated conduits 46, 48, and 50 are used together, or in isolation, with no dedicated heating mechanism applied to the tri-axis connector 53, insufficient heat transfer to frozen DEF 32 therein may prevent the ability of the entire dosing system 30 to dose within the government-specified times. As a non-limiting possibility, the heating system 66 may electrically heat the DEF supply line 37 using one or more resistive wires. However, alternative heating arrangements, such as engine coolant systems, may also be used.

Figure 8:
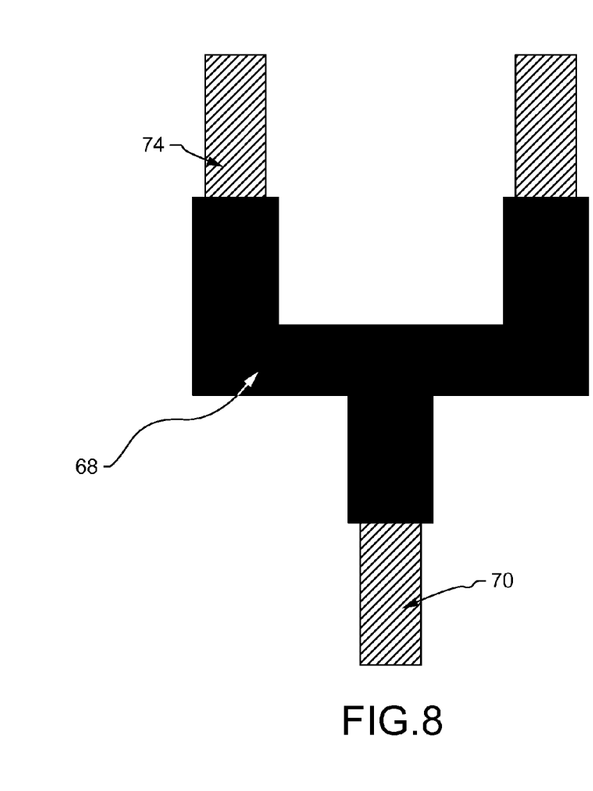
FIG. 8 is a front view of the DEF supply line similar to FIG. 7, but showing an overmold securing the heating system, constructed in accordance with the present disclosure.

In order to secure the heating system 66 in place as well as to provide insulation, an overmold and/or shrink wrap 68 may be molded or wrapped around the heating system 66, particularly near the tri-axis connector 53, as shown in FIG. 8. Applicants have found that the T-connector 55, as opposed to a Y-connector, provides improved clearance for the overmold/shrinkwrap 68. Specifically, the T-connector 55 provides wider access for wrapping the overmold/shrinkwrap 68 around the T-connector 55 and the conduits 46, 48, as compared with a Y-connector in which the outlet ports are closer together. Furthermore, the flat T-shape of the T-connector 55 provides more surface area that allows more even wrapping of the overmold/shrinkwrap 68 over the T-connector 55 and the conduits 46, 48, and 50 compared with a Y-connector. However, it will be understood that that a Y-connector may also be used as the tri-axis connector 53 provided that the Y-connector provides sufficient clearance for the heating system 66 and/or the overmold/shrinkwrap 68 as well as other components such as the adapters 56.

If the heating system 66 is an electrical heating system and a single power driver is unable to fulfill the electrical load requirements to heat the DEF 32 in the DEF supply line 37 within desired timeframes, the heating system 66 may be separated into a plurality of electrical circuits powered by a plurality of power drivers. As one possibility, the supply conduit 46 may be heated by a first electrical circuit 70 which may be connected to and powered by a first power driver via an electrical connector 72, as shown. In addition, the tri-axis connector 53, the first delivery conduit 48, and the second delivery conduit 50 may be heated by a second electrical circuit 74 which may be connected to and powered by a second power driver via an electrical connector 76. The first electrical circuit 70 and the second electrical circuit 74 may include resistive wires which may be wrapped around and/or placed in close proximity to the conduits 46, 48, and 50. In addition, the first electrical circuit 70 and the second electrical circuit 74 may be turned on and off together with a single switch, or independently with separate electrical switches. Alternatively, independent control of the first and second electrical circuits 70 and 74 may be achieved by including internal wires that terminate at a common connector (e.g., connector 72, for example) having additional pins. In this way, the multiple power drivers may work together to meet the overall electrical load requirements needed to thaw the DEF 32 in the DEF supply line 37. It will be understood, however, that the heating system may be divided in various alternative configurations as well. In addition, the divided heating system may also be applied to other types of heating arrangements, such as coolant based systems.

Figure 9:
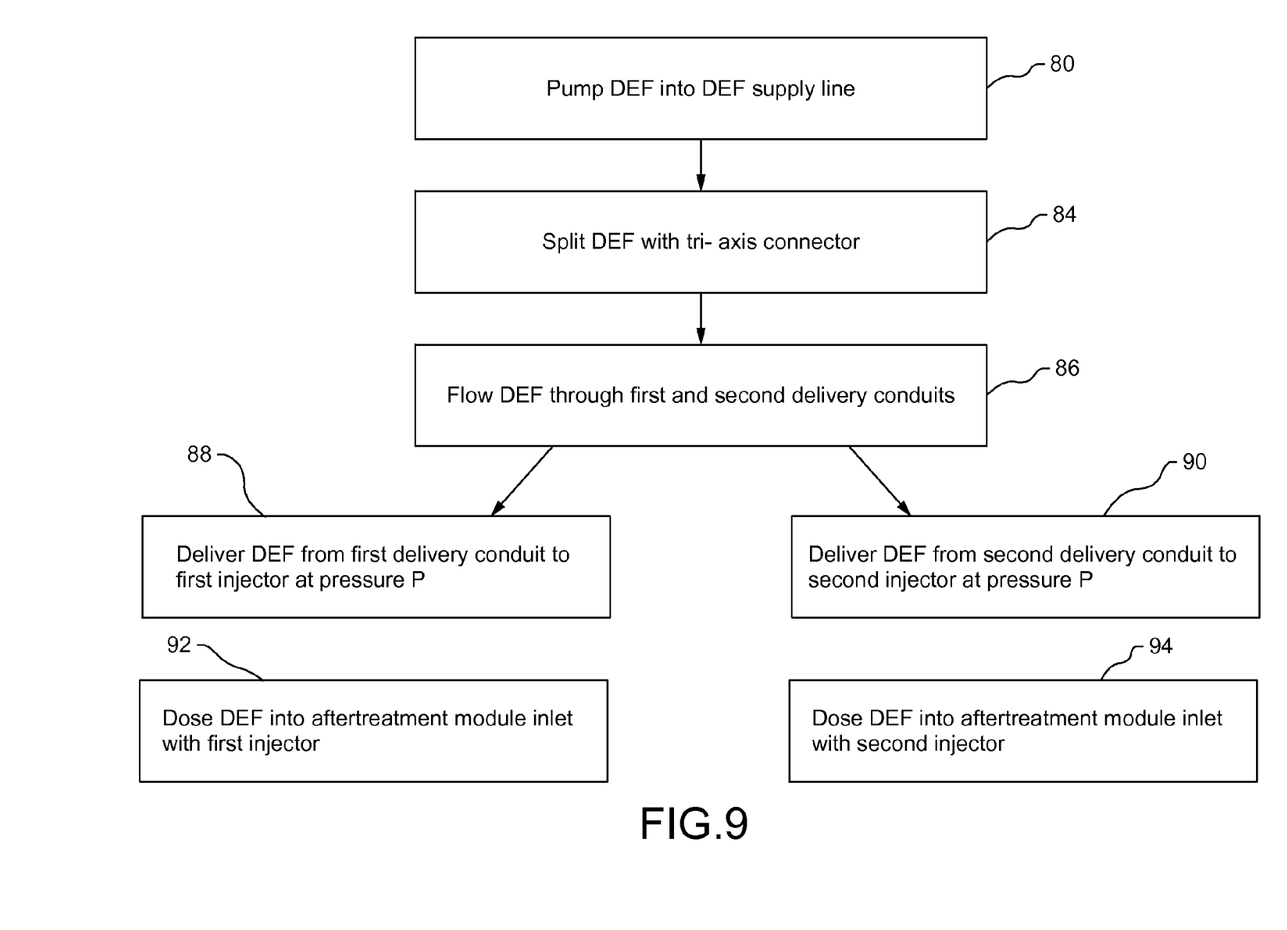
FIG. 9 is a flow chart illustrating a sample sequence of steps that may be involved in delivering DEF to the aftertreatment module using the DEF supply line, in accordance with a method of the present disclosure.

Turning now to FIG. 9, a series of steps that may be involved in delivering the DEF 32 to the injectors 38 and 40 using the dosing system 30 are shown. Beginning with a block 80, the pump 36 may pump the DEF 32 from the supply tank 34 to the DEF supply line 37 via the supply conduit 46. At the outlet 58 of the supply conduit 46, the DEF 32 may be split into two portions by the tri-axis connector 53 according to a next block 84. The portion of the DEF 32 exiting the first outlet port 62 may then flow through the first delivery conduit 48, while the portion of the DEF 32 exiting the second outlet port 64 may flow through the second delivery conduit 50 according to a block 86. Due to the design of the first delivery conduit 48 and the second delivery conduit 50 as explained in detail above, the split portions of the DEF flowing through the first delivery conduit 48 and the second delivery conduit 50 may experience identical or nearly identical hydraulic pressure losses. Thus, the separate portions of the DEF 32 may have the same (i.e., within ±10% of each other) pressures (P)/flow rates upon reaching the first injector 38 and the second injector 40, according to the blocks 88 and 90. As a result of this, the injectors 38 and 40 may then each dose the same amount (i.e., within ±10% of each other) of the DEF 32 into the inlet 24 of the aftertreatment module 20. It will be understood that the steps depicted in FIG. 9 may also be carried out with concomitant heating of the DEF 32 in the DEF supply line 37 if needed, using the heating system 66 as described in detail above.

INDUSTRIAL APPLICABILITY

The teachings of the present disclosure may find industrial applicability in a variety of settings such as, but not limited to, SCR aftertreatment modules in diesel engines. The DEF dosing system disclosed herein uses a single pump to provide DEF to two injectors at an inlet of the aftertreatment module. In addition, the DEF supply line between the pump and the two injectors may have a tri-axis connector to split the DEF into two separate delivery conduits leading to the two injectors. In one aspect of the present disclosure, the tri-axis connector is a T-connector which provides sufficient clearance for heating systems used to thaw the DEF supply line as well as overmolds/shrinkwrap used to secure the heating system to the DEF supply line. In addition, the two delivery conduits leading to the two injectors are configured such that the hydraulic pressure losses of the DEF flowing through the two delivery conduits are the same. As a result, the split DEF portions may reach the two injectors at the same hydraulic pressures and flow rates, such that the dosing variance between the two injectors (i.e., the difference in the amount of DEF dosed into the inlet by the two injectors) does not exceed 10%. Such an arrangement provides improved control and predictability over the amount of DEF that is dosed into the inlet of the aftertreatment module and is available for $NO_x$ reduction. Moreover, the dosing system disclosed herein may have a heating system that is split into multiple electrical circuits which thaw the DEF in different portions of the DEF supply line. The multiple electrical circuits may be powered by multiple power drivers to meet the overall electrical load requirements needed to thaw the DEF in the DEF supply line. It is expected that the technology disclosed herein may find industrial applicability in a range of areas applicable to $NO_x$ aftertreatment systems in diesel engines.

What is claimed is:

1. A dosing system for dosing diesel exhaust fluid (DEF) into an inlet of a selective catalytic reduction (SCR) aftertreatment module of a diesel engine, comprising:
   a pump configured to pump the DEF from a supply tank, the DEF consisting of a mixture of urea and water;
   a first injector and a second injector configured to dose the DEF into the inlet of the SCR aftertreatment module, the first and second injectors being configured to dose the DEF upstream of a same selective catalytic reduction (SCR) catalyst; and
   a DEF supply line configured to deliver the DEF from the pump to the first injector and the second injector, the DEF supply line including:
      a tri-axis connector having a first outlet port and a second outlet port, the tri-axis connector being in fluid communication with the pump and configured to split the DEF from the pump into two portions each exiting one of the first outlet port and the second outlet port;
      a first delivery conduit in fluid communication with the first outlet port and configured to deliver the DEF exiting the first outlet port to the first injector;

a second delivery conduit in fluid communication with the second outlet port and configured to deliver the DEF exiting the second outlet port to the second injector, the first delivery conduit and the second delivery conduit being configured such that the first injector and the second injector dose a same quantity of the DEF into the inlet; and a heating system configured to heat the first delivery conduit, the second delivery conduit, and the tri-axis connector, the tri-axis connector being configured to provide clearance for the heating system.

2. The dosing system of claim 1, wherein a dosing variance between the first injector and the second injector does not exceed 10%.

3. The dosing system of claim 1, wherein the first delivery conduit has a length L1 and the second delivery conduit has a length L2, and wherein L1 is equal to L2.

4. The dosing system of claim 1, wherein the tri-axis connector is a T-connector.

5. The dosing system of claim 1, wherein the tri-axis connector is a Y-connector.

6. The dosing system of claim 1, wherein the first and second delivery conduits have equivalent inner diameters and equivalent lengths such that hydraulic pressure losses of the DEF flowing through the first and second delivery conduits are the same.

7. The dosing system of claim 6, wherein the heating system includes a plurality of electrical circuits configured to heat separate portions of the DEF supply line, and wherein the plurality of electrical circuits are powered by a single power driver.

8. The dosing system of claim 6, wherein the heating system includes a plurality of electrical circuits configured to heat separate portions of the DEF supply line, and wherein the plurality of electrical circuits are powered by a plurality of power drivers.

9. The dosing system of claim 8, wherein the DEF supply line further includes a supply conduit configured to receive the DEF from the pump, and wherein the tri-axis connector further includes an inlet port in fluid communication with the supply conduit and is configured to receive the DEF from the supply conduit.

10. The dosing system of claim 9, wherein the supply conduit is heated by a first electrical circuit powered by a first power driver, and wherein the tri-axis connector, the first delivery conduit, and the second delivery conduit are heated by a second electrical circuit powered by a second power driver.

11. A diesel engine system, comprising:
at least one combustion chamber;
an exhaust line; and
a selective catalytic reduction (SCR) aftertreatment module in fluid communication with the exhaust line and including an inlet, an SCR catalyst downstream of the inlet, and a dosing system configured to dose diesel exhaust fluid (DEF) into the inlet, the DEF consisting of a mixture of urea and water, the dosing system including
a pump configured to pump the DEF from a supply source,
a first injector and a second injector mounted on a top of the inlet and being configured to inject the DEF into the inlet, and
a DEF supply line mounted on a side of the SCR aftertreatment module and being configured to deliver the DEF from the pump to the first injector and the second injector, the DEF supply line including
a T-connector having a first outlet port and a second outlet port, the T-connector being in fluid communication with the pump and configured to split the DEF from the pump into two equivalent portions each exiting one of the first outlet port and the second outlet port,
a first delivery conduit in fluid communication with the first outlet port and configured to deliver the DEF exiting the first outlet port to the first injector,
a second delivery conduit in fluid communication with the second outlet port and configured to deliver the DEF exiting the second outlet port to the second injector, the first delivery conduit and the second delivery conduit being configured such that the first injector and the second injector dose a same quantity of the DEF into the inlet,
adapters connecting the T-connector to the first delivery conduit and the second delivery conduit, and
a heating system configured to heat the first and second delivery conduits and the T-connector, the heating system including an overmold that secures the heating system to the T-connector and the first and second delivery conduits, the T-connector being configured to provide clearance for the overmold and the adapters.

12. The diesel engine system of claim 11, wherein a dosing variance between the first injector and the second injector does not exceed 10%.

13. The diesel engine system of claim 11, wherein the first delivery conduit has a length L1 and the second delivery conduit has a length L2, and wherein L1 is equal to L2.

14. The diesel engine system of claim 11, wherein the first and second delivery conduits have equivalent inner diameters and equivalent lengths such that hydraulic pressure losses of the DEF flowing through the first and second delivery conduits are the same.

15. The diesel engine system of claim 12, wherein a total dosing capability of the first injector and the second injector is at least equal to a pumping capability of the pump.

16. The diesel engine system of claim 11, wherein the heating system includes a plurality of electrical circuits configured to heat separate portions of the DEF supply line, and wherein the plurality of electrical circuits are powered by a plurality of power drivers.

17. The diesel engine system of claim 16, wherein the DEF supply line further includes a supply conduit configured to receive the DEF from the pump, and wherein an inlet port of the T-connector is in fluid communication with the supply conduit and is configured to receive the DEF from the supply conduit.

18. The diesel engine system of claim 17, wherein the supply conduit is heated by a first electrical circuit powered by a first power supply, and wherein the T connector, the first delivery conduit, and the second delivery conduit are heated by a second electrical circuit powered by a second power supply.

19. A method for dosing diesel exhaust fluid (DEF) into an inlet of a selective catalytic reduction (SCR) aftertreatment module of a diesel engine, comprising:
flowing the DEF from a pump through a supply conduit, the DEF consisting of a mixture of urea and water;
splitting a flow of the DEF exiting the supply conduit into two equivalent portions with a tri-axis connector, the two portions each exiting one of a first outlet port and a second outlet port of the tri-axis connector;

flowing the DEF exiting the first outlet port through a first delivery conduit;

flowing the DEF exiting the second outlet port through a second delivery conduit;

heating the DEF flowing through the supply conduit, the tri-axis connector, the first delivery conduit, and the second delivery conduit with a heating system, the heating system including an overmold to secure the heating system to the tri-axis connector, the heating system further including a first electrical circuit powered by a first power supply configured to heat the supply conduit and a second electrical circuit powered by a second power supply configured to heat the tri-axis connector and the first and second delivery conduits, the tri-axis connector being configured to provide a clearance for the overmold and the heating system;

delivering the DEF from the first delivery conduit to a first injector;

delivering the DEF from the second delivery conduit to a second injector; and dosing the DEF into the inlet of the SCR aftertreatment module with the first injector and the second injector, the first injector and the second injector dosing a same quantity of the DEF into the inlet.

* * * * *